US012778108B2

(12) United States Patent
Azuchi

(10) Patent No.: US 12,778,108 B2
(45) Date of Patent: Nov. 3, 2026

(54) MOBILE REMOVAL DEVICE

(71) Applicant: FUTABA INDUSTRIAL CO., LTD., Okazaki (JP)

(72) Inventor: Shinya Azuchi, Okazaki (JP)

(73) Assignee: FUTABA INDUSTRIAL CO., LTD.

( * ) Notice: Subject to any disclaimer, the term of this patent is extended or adjusted under 35 U.S.C. 154(b) by 0 days.

(21) Appl. No.: 19/210,198

(22) Filed: May 16, 2025

(65) Prior Publication Data

US 2025/0374911 A1 Dec. 11, 2025

(30) Foreign Application Priority Data

Jun. 10, 2024 (JP) ................................ 2024-093757

(51) Int. Cl.
*A01M 21/04* (2006.01)

(52) U.S. Cl.
CPC .................................. *A01M 21/04* (2013.01)

(58) Field of Classification Search
CPC .............................. A01M 21/04; A01M 21/00
See application file for complete search history.

(56) References Cited

U.S. PATENT DOCUMENTS 6,671,582 B1 * 12/2003 Hanley .................. A01B 51/02 47/1.01 R
2015/0075068 A1 * 3/2015 Stowe .................. A01D 43/003 56/229
2018/0139947 A1 * 5/2018 Albert ..................... A01M 7/00
2020/0072809 A1 3/2020 Bhanu et al.
2021/0076662 A1 3/2021 Mikesell et al.
2021/0137094 A1 * 5/2021 Jimenez Tarodo . A01M 21/046
2022/0174934 A1 * 6/2022 Germain .............. A01B 79/005
2022/0184729 A1 6/2022 Mizumura
2023/0413800 A1 12/2023 Jasko et al.
2024/0074427 A1 * 3/2024 Tanner ................ A01M 7/0042
2024/0183989 A1 * 6/2024 Nicholls .............. G06V 20/188
2025/0340313 A1 * 11/2025 Reyntjens ................ B64D 1/18

FOREIGN PATENT DOCUMENTS

CN 116569908 A 8/2023
CN 116965394 A * 10/2023 ............ A01M 21/04
CN 117837574 A * 4/2024 ............. H04N 25/71
JP S6060174 U 4/1985
JP 2020148804 A 9/2020

(Continued)

OTHER PUBLICATIONS

Translation of CN-117837574-A (Year: 2024).*

(Continued)

*Primary Examiner* — William L Gmoser
(74) *Attorney, Agent, or Firm* — Withrow + Terranova, PLLC; Vincent K. Gustafson

(57) ABSTRACT

Provided is a mobile removal device. The mobile removal device includes a camera, a laser oscillator, a controller, and a guide portion. The guide portion includes one or more reflectors configured to reflect a laser beam. At least one of the one or more reflectors is a specific reflector having a function of reflecting the laser beam and a function of transmitting a light that can be captured by the camera. The camera is arranged so that an optical axis of the camera passes through the specific reflector in an area where the laser beam does not pass through.

14 Claims, 3 Drawing Sheets

(56) References Cited

FOREIGN PATENT DOCUMENTS

| | | | |
|---|---|---|---|
| JP | 2021065890 | A | 4/2021 |
| JP | 2022548645 | A | 11/2022 |
| JP | 2023116312 | A | 8/2023 |

OTHER PUBLICATIONS

Translation of CN-116965394-A (Year: 2023).*
Office Action for U.S. Appl. No. 19/210,055 mailed Dec. 30, 2025, 8 pages.
Office Action for Chinese Patent Application No. 202510762336.X mailed Aug. 25, 2026 20 pages.
Office Action for Japanese Patent Application No. 2024-093757 mailed on Aug. 18, 2026, 6 pages.
Office Action for Chinese Patent Application No. 202510755181.7 mailed Aug. 21, 2026 8 pages.
Office Action for Japanese Patent Application No. 2024-093759 mailed on Aug. 18, 2026, 6 pages.
Office Action for Chinese Patent Application No. 202510759055.9 mailed on Aug. 22, 2026, 31 pages.

* cited by examiner

MOBILE REMOVAL DEVICE

CROSS-REFERENCE TO RELATED APPLICATIONS

This application claims the benefit of priority based on Japanese Patent Application No. 2024-093757 filed on Jun. 10, 2024, with the Japan Patent Office, and the entire disclosure of Japanese patent application No. 2024-093757 is incorporated herein by reference.

BACKGROUND

The present disclosure relates to a mobile removal device for removing hindrances that may inhibit plant growth.

As described in Japanese Unexamined Patent Application Publication No. 2023-116312, a mobile weeder is known which is configured to remove an undesirable plant occurring in agricultural land by irradiating the undesirable plant with a laser beam. This mobile weeder includes a camera for capturing the ground below the device, grasps a position of the undesirable plant based on a captured image taken by the camera, and emits a laser beam toward the undesirable plant from a laser irradiation device installed at a lower part of a body of the mobile weeder.

SUMMARY

However, in the above mobile weeder, a position of the laser irradiation device installed at the lower part of the body of the mobile weeder is distanced from a position of the camera. Therefore, when an irradiation position of the laser beam is controlled, a correction process with respect to a position determined based on the captured image taken by the camera becomes complicated.

In one aspect of the present disclosure, it is desirable to simplify the correction process with respect to the irradiation position of the laser beam.

One aspect of the present disclosure is a mobile removal device configured to irradiate, with a laser beam, a hindrance capable of inhibiting plant growth. The mobile removal device includes a camera, a laser oscillator, a controller, a guide portion, and a movement mechanism.

The camera is configured to capture a hindrance. The laser oscillator is configured to output a laser beam. The controller is configured to detect the hindrance based on a captured image taken by the camera and to control the laser oscillator. The guide portion is configured to guide the laser beam output by the laser oscillator. The movement mechanism is configured to move the mobile removal device.

The guide portion includes one or more reflectors configured to reflect the laser beam. At least one of the one or more reflectors is a specific reflector having a function of reflecting the laser beam and a function of transmitting a light that can be captured by the camera. The camera is arranged so that an optical axis of the camera passes through the specific reflector in an area where the laser beam does not pass through.

In this configuration, the camera is arranged so that the optical axis of the camera passes through the specific reflector. Thus, an optical axis (irradiation axis) of the laser beam reflected by the specific reflector and the optical axis of the camera can be brought closer than a case where the optical axis of the camera does not pass through the specific reflector. This simplifies the calculation for correcting the irradiation position of the laser beam L, and thus simplifies the correction process at that time.

In one aspect of the present disclosure, the controller may change a direction in which the one or more reflectors reflect the laser beam to thereby control an irradiation position of the laser beam. With this configuration, the irradiation position of the laser beam can be controlled using the reflector.

In one aspect of the present disclosure, at least one of the one or more reflectors is configured as a galvanometer mirror. With this configuration, the irradiation position of the laser beam can be controlled using the galvanometer mirror.

In one aspect of the present disclosure, the controller may recognize the irradiation position of the laser beam based on the captured image taken by the camera and may correct the irradiation position of the laser beam. With this configuration, the feedback control using the captured image can be performed. Thus, the position of the laser beam can be corrected with high accuracy.

In one aspect of the present disclosure, the specific reflector may be configured as a dichroic mirror. With this configuration, the dichroic mirror can be used to achieve the functions of reflecting the laser beam and transmitting light that can be captured by the camera.

In one aspect of the present disclosure, the controller may output the laser beam from the laser oscillator while the mobile removal device is moved by the moving mechanism. With this configuration, the mobile removal device can perform the removing operation while moving.

In one aspect of the present disclosure, the laser oscillator may output a blue laser beam. In this configuration, the blue laser beam, i.e., a light having a wavelength with a relatively high energy density is used among visible light rays, thereby enabling optimal removing. The blue laser is in a wavelength range where energy is not easily absorbed by water. Thus, the blue laser can efficiently remove the hindrance even if the hindrance is covered by water components, such as rain.

BRIEF DESCRIPTION OF THE DRAWINGS

An embodiment of the present disclosure will be described hereinafter by way of example with reference to the accompanying drawings, in which.

DETAILED DESCRIPTION OF EXEMPLARY EMBODIMENTS

Hereinafter, an example embodiment of the present disclosure will be described with reference to the drawings.

1-1. Correspondence Between the Configuration of the Disclosure and the Configuration of the Embodiment A galvanometer mirror 40 and a dichroic mirror 41 of the present embodiment correspond to an example of a reflector of this disclosure, and the dichroic mirror 41 of the present embodiment corresponds to an example of a specific reflector of this disclosure. A wheel 22 and a not-shown motor or the like for driving the wheel 22 of the present embodiment correspond to examples of a movement mechanism of this disclosure.

1-2. Configuration

(1) Overview

Figure 1A:
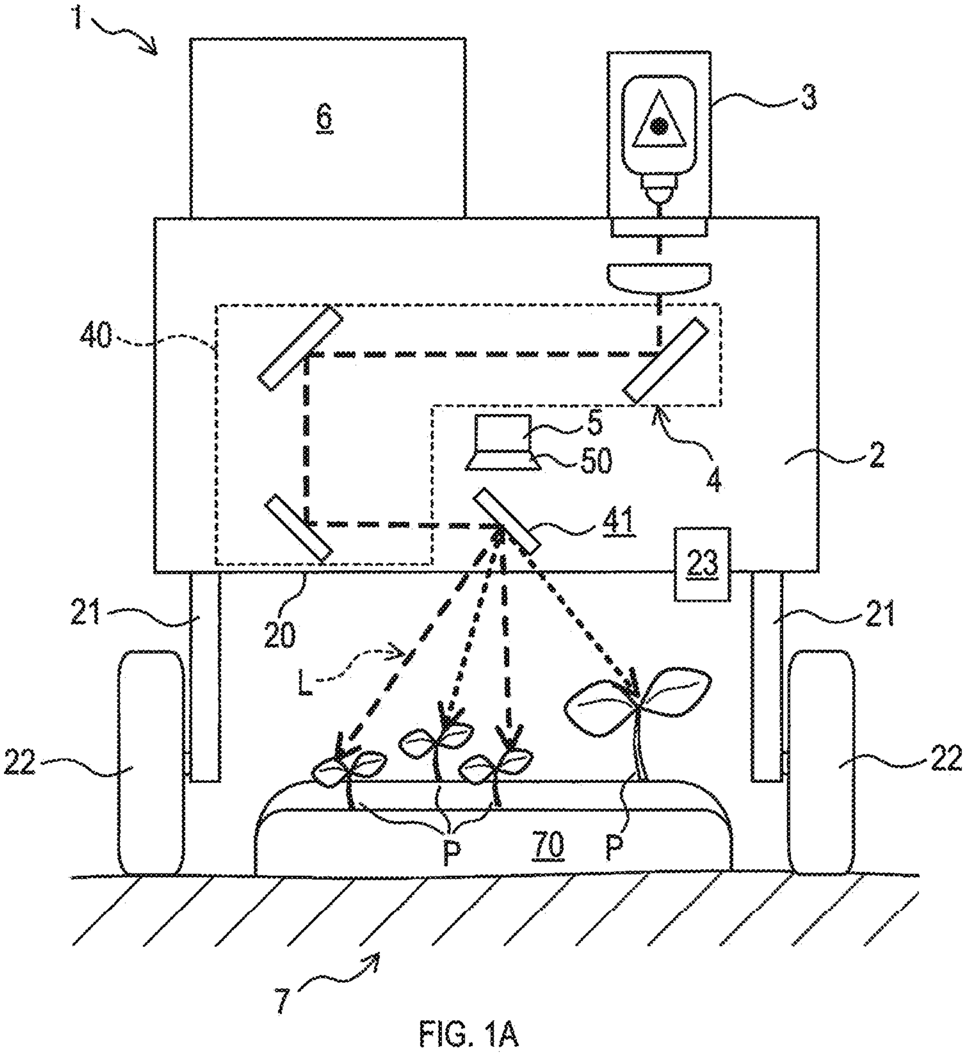
FIG. 1A is an explanatory diagram showing a mobile removal device as seen from the front.

A mobile removal device 1 in one aspect of the present embodiment is configured to irradiate, with a laser beam L, an undesirable plant P (e.g., a weed) that has grown around crops in an agricultural land 7 and that may inhibit the growth of the crop to thereby remove the undesirable plant P (see. FIG. 1A). The mobile removal device 1 is movable, and detects the undesirable plant P while moving through the agricultural land 7, and irradiates the detected undesirable plant P with the laser beam L. The mobile removal device 1 includes a main body 2, a laser oscillator 3, a guide portion 4, a camera 5, and a controller 6.

(2) Main Body

The main body 2 is a housing that holds the laser oscillator 3, the guide portion 4, the camera 5, the controller 6, and a battery or the like that is not shown (see FIG. 1A). The main body 2 is also provided with a plurality of legs 21, a plurality of wheels 22, and an illuminator 23.

The legs 21 are provided around the edge of a lower part 20 of the main body 2, which is a part facing the ground, and protrude downward. The legs 21 are respectively provided with the wheels 22 for moving the mobile removal device 1 at the lower ends of the legs. As an example, these wheels 22 may be driven by a motor that is not shown. Of course, the mobile removal device 1 is not limited to the foregoing, and may be configured to be moved by an operator pushing or pulling the main body 2. The main body 2 may be provided with one or more electric crawlers, for example, instead of the wheels 22, or may be configured to move by flying, such as a flying-type drone.

The illuminator 23 is provided in a lower part 20 of the main body 2 and illuminates an area of the ground below the main body 2.

(3) Camera

Figure 1B:
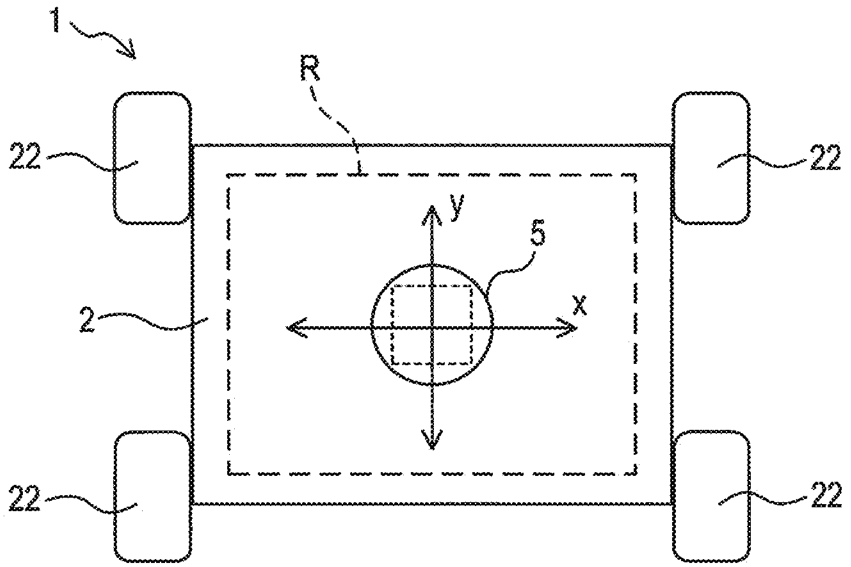
FIG. 1B is an explanatory diagram of the mobile removal device and an image recognition region.

The camera 5 is provided in the lower part 20 of the main body 2 in a region where the laser beam L does not pass through, and includes a wide-angle lens 50 (see FIG. 1A). For example, the camera 5 is arranged to capture the ground and/or a plant through a dichroic mirror 41 that functions as a specific reflector as described below. The camera 5 is configured to capture the area of the ground facing the lower part 20, i.e., the area directly below the main body 2, using the wide-angle lens 50 (see FIG. 1B). Of course, the camera 5 is not limited to this configuration, and may also capture the vicinity of the area directly below the main body 2.

In the mobile removal device 1, the undesirable plant P located on the ground within the image recognition region R of an imaging range of the camera 5 is detected, and the undesirable plant P is irradiated with the laser beam L.

(4) Laser Oscillator

The laser oscillator 3 is configured to output the laser beam L (see FIG. 1A). As an example, a semiconductor laser may be used as the laser oscillator 3; however, other oscillators that output the laser beam L in various ways may be used without being limited to this configuration.

In the first embodiment, the laser beam L is visible light, for example. More specifically, the wavelength of the laser beam L is 400 nm or more and less than 550 nm, for example, and a blue laser is used as the laser beam L. Of course, the laser beam L is not limited to the foregoing. For example, a laser beam L other than the blue laser and a laser beam L other than the visible light may be used. The blue laser is in a wavelength range where energy is not easily absorbed by water. Thus, the blue laser can efficiently remove the plant P even if the plant is covered by water components, such as rain.

(5) Guide Portion

The guide portion 4 includes a plurality of optical elements, and is configured to guide the laser beam L output by the laser oscillator 3 so that the laser beam L is emitted from the lower part 20 of the main body 2 downward to the undesirable plant P located below the main body 2 (see FIG. 1A). Specifically, the guide portion 4 includes three galvanometer mirrors 40 and a dichroic mirror 41.

The three galvanometer mirrors 40 are arranged side by side and the laser beam L output by the laser oscillator 3 is sequentially reflected by these galvanometer mirrors 40. Each of the three galvanometer mirrors 40 is movable in an x-axis direction and a y-axis direction. As an example, the y-axis may extend parallel to a direction of travel of the mobile removal device 1 and the x-axis may extend in a direction perpendicular to the direction of travel. Each galvanometer mirror 40 changes its orientation through a galvanometer scanner in accordance with a signal from the controller 6 to thereby change the path of the laser beam L. This displaces an irradiation position of the laser beam L in the corresponding direction.

(6) Dichroic Mirror

The dichroic mirror 41 is a mirror that transmits light in a specific wavelength range and reflects light in the remaining wavelength range, using interference of light by a thin film. The dichroic mirror 41 has a function of reflecting the laser beam L and a function of transmitting light that can be captured by the camera 5. Specifically, the dichroic mirror 41 has a surface finish on the reflective surface so as to reflect light having the wavelength of the laser beam L and to transmit light having wavelengths other than the wavelength of the laser beam L.

In this way, the dichroic mirror 41 is configured as a reflector that reflects the laser beam L reflected by the three galvanometer mirrors 40 toward the area of the ground below the main body 2 (see FIG. 1A). That is, the laser beam L output by the laser oscillator 3 is finally reflected by the half mirror 41 before the laser beam L is emitted from the lower part 20 of the main body 2 toward the ground.

The dichroic mirror 41 is arranged below the camera 5 and between the camera 5 and the agricultural land 7 (e.g., a ridge 70). In other words, the dichroic mirror 41 is arranged in an area through which an optical axis of the camera 5 passes.

In particular, it is preferable that the dichroic mirror 41 and the camera 5 are arranged so that an irradiation axis of the laser beam L and the optical axis of the camera 5 are coaxial. Here, the irradiation axis of the laser beam L represents an origin of a coordinate system at the time of laser irradiation. The optical axis of the camera 5 represents an origin of a coordinate system of the captured image. In this embodiment, these origins are positioned at the center of the x-axis and y-axis in the image recognition region R shown in FIG. 1B, i.e., at a position directly below the center of the camera 5.

With this arrangement, when the irradiation position of the laser beam L is found to deviate from a target position during the weeding operation described below, the processing to correct this irradiation position based on a position within the image recognition region R of the captured image can be simplified. In other words, at the time of correcting the irradiation position of the laser beam L, it is necessary to associate the origin of the image recognition region R with the origin of the irradiation position of the laser beam L, and then to obtain coordinates of the irradiation position of the laser beam L based on the coordinates within the image recognition region R. In this case, when the origin of the image recognition region R is coincident or substantially coincident with the origin of the laser beam L, the processing to associate these origins can be omitted or simplified, thereby simplifying the processing at the time of making a correction.

This configuration also reduces the deviation in coordinates, which is caused by a height of the undesirable plant P, between the coordinates within the image recognition region R and the coordinates of the irradiation position of the laser beam L. It is not necessary for the irradiation axis of the laser beam L and the optical axis of the camera 5 to be perfectly coaxial. It is sufficient if they are close enough to simplify the correction process.

(7) Controller

Figure 2:
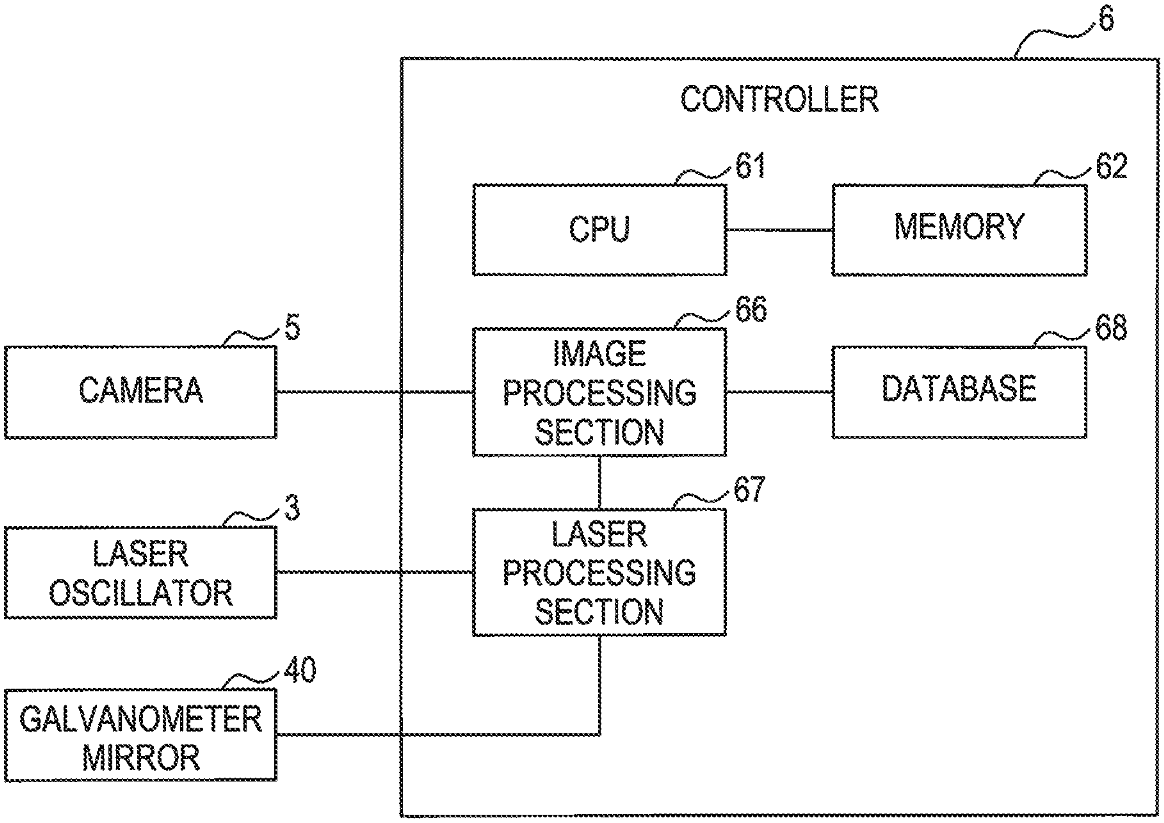
FIG. 2 is a block diagram showing a configuration of the mobile removal device.

The controller 6 is a part that comprehensively controls the mobile removal device 1 and includes a CPU 61, a memory 62, and a database 68 as shown in FIG. 2. The database 68 stores information about the undesirable plant P. The CPU 61 executes a program stored in the memory 62, thereby performing various functions of the mobile removal device 1. Note that the various functions performed by the controller 6 are not achieved solely by the execution of the program. Some or all of the functions may be achieved by one or more hardware components. The database 68 may store information about a desirable plant (i.e., the crop). Plants other than the desirable plant may be determined as the undesirable plants P.

The controller 6 includes an image processing section 66 and a laser processing section 67 as functions of the processing performed by the CPU 61. The image processing section 66 is configured to identify the undesirable plant P based on the captured image taken by the camera 5. The image processing section 66 can identify the undesirable plant P using AI (i.e., artificial intelligence) constructed by a known statistical method.

The image processing section 66 can identify the coordinates of the undesirable plant P and the irradiation position of the laser beam L based on the captured image taken by the camera 5. Since the camera 5 obtains the captured image through the dichroic mirror 41, the image processing section 66 cannot directly recognize the laser beam L. However, the image processing section 66 can recognize the captured image showing that a portion irradiated by the laser beam L is changed and/or a target portion is not changed. As a result, the image processing section 66 can indirectly recognize the irradiation position of the laser beam L.

The laser processing section 67 instructs the laser oscillator 3 and the galvanometer mirrors 40 to emit the laser beam L toward the coordinates of the undesirable plant P identified by the image processing section 66. In other words, the laser processing section 67 changes directions in which the galvanometer mirrors 40 reflect the laser beam L to thereby control the irradiation position of the laser beam L. At this time, the laser processing section 67 recognizes the irradiation position of the laser beam L based on the captured image taken by the camera 5 and corrects the irradiation position of the laser beam L. The laser processing section 67 also adjusts an irradiation amount and an irradiation path of the laser beam L based on the characteristics of the undesirable plant P determined by the image processing section 66.

In addition, the controller 6 is configured to detect a location (hereinafter, referred to as "current location") of the mobile removal device 1. Specifically, the controller 6 may detect the current location using, for example, GPS. Alternatively, the controller 6 may detect a speed and a direction of travel of the mobile removal device 1 using a sensor to thereby detect the current location based on these detection results.

1-3. Process

Figure 3:
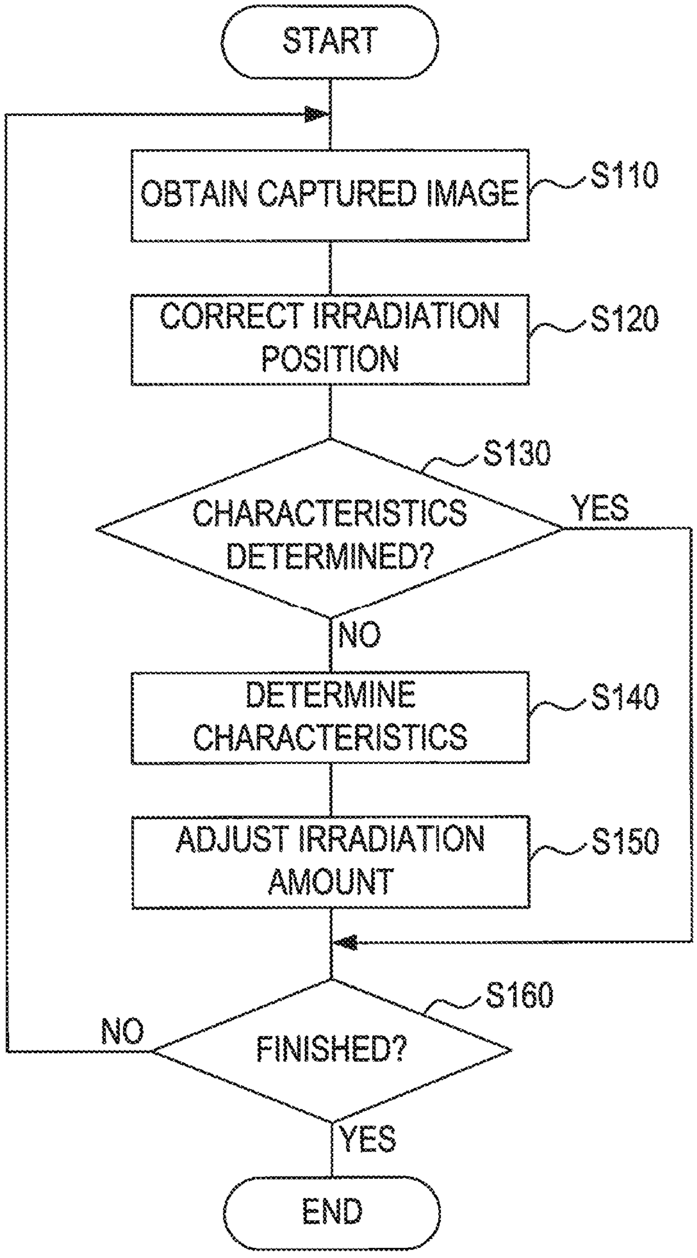
FIG. 3 is a flow chart showing an example of a weeding operation performed by a control device.

Next, an example of a weeding operation performed by the CPU 61 of the controller 6 is described using a flow chart of FIG. 3. The weeding operation is performed while the mobile removal device 1 is moved by the movement mechanism.

In this process, the CPU 61 first obtains a captured image taken by the camera 5 in S110. The CPU 61 then correct an irradiation position of the laser beam L based on the captured image in S120. At this time, the CPU 61 focuses on changes in the captured image, such as changes in the shape of the undesirable plant P and changes in the color of the ridge 70, and recognizes the position that is being irradiated with the laser beam L. The CPU 61 then calculates a coordinate difference between the target position and the actually irradiated position, and drives the galvanometer mirrors 40 so that this coordinate difference becomes zero. The process of S120 is performed only when the laser beam L is being emitted.

Then, in S130, the CPU 61 determines whether the characteristics of all the undesirable plants P included in the captured image have been determined. The characteristics of the undesirable plants P are described later. If the characteristics of all the undesirable plants P have been determined, the CPU 61 proceeds to S160. If the characteristics of at least one undesirable plant P have not been determined, the CPU 61 proceeds to S140.

The CPU 61 determines, in S140, the characteristics of the undesirable plant P that has not been determined. The characteristics of the undesirable plant P include the size and type of the undesirable plant P. The database 68 contains information on the shape and color of the undesirable plant P according to the type of the undesirable plant P, and information on an irradiation amount of the laser beam L according to these pieces of information. The information on the irradiation amount of the laser beam L includes an output and an irradiation time of the laser beam L. The CPU 61 determines the characteristics of the undesirable plant P by pattern matching in which the shape and color of the undesirable plant P in the captured image are compared with the information on the shape, color, and the like of the undesirable plant P in the database 68 to thereby identify the undesirable plant P.

Next, the CPU 61 adjusts the irradiation amount in S150. That is, the CPU 61 sets the irradiation amount of the laser beam L that is suitable for the characteristics of the undesirable plant P by referring to the database 68. The CPU 61 controls the laser oscillator 3 so that the irradiation amount becomes a set amount and causes the laser oscillator 3 to output the laser beam L. As a result, the undesirable plant P withers and dies.

Next, the CPU 61 determines in S160 whether the irradiation of the laser beam L is finished. If the irradiation of the laser beam L is not finished, the process in or after S110 is repeated. As a result, feedback control is achieved in which the irradiation position of the laser beam L is corrected using the captured image.

When the irradiation of the laser beam L is finished, the process ends.

1-4. Effects

In the embodiment detailed above, the following effects can be obtained.

(1a) The configuration of the embodiment is the mobile removal device 1 configured to irradiate, with the laser beam L, the undesirable plant P that may inhibit the plant growth. The mobile removal device 1 includes the camera 5, the laser oscillator 3, the controller 6, the guide portion 4, and the movement mechanism (e.g., the wheels 22).

The camera 5 is configured to capture the ground. The laser oscillator 3 is configured to output the laser beam L. The controller 6 is configured to detect the undesirable plant P on the ground based on the captured image taken by the camera 5, and to control the laser oscillator 3. The guide portion 4 is configured to guide the laser beam L output by the laser oscillator 3. The movement mechanism is configured to move the mobile removal device 1 along the ground.

The guide portion 4 includes one or more reflectors configured to reflect the laser beam L. At least one of the reflectors is the dichroic mirror 41 that has the function of reflecting the laser beam L and the function of transmitting light that can be captured by the camera 5. The camera 5 is arranged so that the optical axis of the camera 5 passes through the dichroic mirror 41 in an area where the laser beam L does not pass through.

In this configuration, the camera 5 is arranged so that the optical axis passes through the dichroic mirror 41. Therefore, the irradiation axis of the laser beam L reflected by the dichroic mirror 41 and the optical axis of the camera 5 can be brought closer than a case where the optical axis does not pass through the dichroic mirror 41. This simplifies the calculation for correcting the irradiation position of the laser beam L, and thus simplifies the correction process at this time.

(1b) In the configuration of this embodiment, the controller 6 changes the direction in which the reflector reflects the laser beam L to thereby control the irradiation position of the laser beam L. With this configuration, the irradiation position of the laser beam L can be controlled using the reflector.

(1c) In the configuration of this embodiment, at least one of the reflectors is configured as the galvanometer mirror 40. With this configuration, the irradiation position of the laser beam L can be controlled using the galvanometer mirror 40.

(1d) In the configuration of this embodiment, the controller 6 recognizes the irradiation position of the laser beam L based on the captured image taken by the camera 5 and corrects the irradiation position of the laser beam L. With this configuration, the feedback control using the captured image can be performed. Thus, the position of the laser beam L can be corrected with high accuracy.

(1e) The configuration of the embodiment includes the dichroic mirror 41. With this configuration, the dichroic mirror can be used to achieve the functions of reflecting the laser beam L and transmitting the light that can be captured by the camera 5.

(1f) In the configuration of the embodiment, the controller 6 outputs the laser beam L from the laser oscillator 3 while the mobile removal device 1 is moved by the moving mechanism. With this configuration, the mobile removal device 1 can perform the weeding operation while moving.

(1g) In the configuration of the embodiment, the laser oscillator 3 outputs a blue laser beam L. With this configuration, the blue laser beam L, i.e., a light having a wavelength with a relatively high energy density is used among visible light rays, thereby enabling optimal weeding.

2. Other Embodiments

The embodiment of the present disclosure has been described; however, the present disclosure may be embodied in various forms without being limited to the above-described embodiment.

(2a) In the embodiment described above, the dichroic mirror 41 having functions of reflecting the laser beam L and transmitting the light that can be captured by the camera 5 is used. However, the present disclosure is not limited to this configuration. For example, a beam splitter can be used instead of the dichroic mirror 41. In addition, a combination of a spectroscope such as a prism and a mirror can be used to achieve the functions of reflecting the laser beam L and transmitting the light that can be captured by camera 5.

(2b) In the above embodiment, the dichroic mirror 41 is configured to lastly reflect the laser beam L. However, another mirror may be configured to reflect the laser beam L after the dichroic mirror 41. In this case, another mirror may be configured to reflect the light that can be captured by the camera 5.

(2c) In the above embodiment, the mobile removal device 1 is configured to remove the undesirable plant P by irradiating the undesirable plant P with the laser beam L. However, the mobile removal device 1 is not limited to the foregoing and may be configured to remove hindrances other than plants by irradiating the hindrances with the laser beam L. Note that the hindrances are objects that may inhibit the growth of the crops, and as an example, pests can be the hindrances.

(2d) In the above embodiment, the mobile removal device 1 is configured to move on the ground. However, the mobile removal device 1 may be configured as a drone, for example, and may be configured to remove the hindrances, such as the undesirable plant P, while flying over the agricultural land 7 along the path similar to that of the embodiment.

(2e) The controller 6 and the method realized by the controller 6 described in this disclosure may be achieved by a dedicated computer provided with a processor and a memory programmed to perform one or more functions embodied by a computer program. Alternatively, the controller 6 and the method realized by the controller 6 described in this disclosure may be achieved by a dedicated computer provided with a processor configured with one or more dedicated hardware logic circuits. Alternatively, the controller 6 and the method realized by the controller 6 described in this disclosure may be achieved by one or more dedicated computers configured by a combination of a processor and a memory programmed to perform one or more functions and a processor configured with one or more hardware logic circuits. The computer program may be stored in a computer-readable non-transitory tangible storage medium as instructions to be executed by a computer. The method for performing the functions of each part included in the controller 6 does not necessarily include software, and all of the functions may be realized using one or more hardware components.

If a flying mechanism such as a drone is used as a movement mechanism, the camera or the specific reflector can be positioned at a specified height, for example, at a height from a reference position, and the calculation can be further simplified. For example, by flying the mobile removal device so that the specific reflector is positioned at a height of one meter above sea level based on the sea level as a reference point, the height of the specific reflector remains constant even when the mobile removal device moves, and the calculation can be simplified.

(2f) Two or more functions of one element of the aforementioned embodiments may be achieved by two or more elements, and one function of one element may be achieved by two or more elements. Furthermore, two or more functions of two or more elements may be achieved by one element, and one function achieved by two or more elements may be achieved by one element. A part of the configurations of the aforementioned embodiments may be omitted. Furthermore, at least part of the configurations of the aforementioned embodiments may be added to or replaced with another configuration of the above-described embodiments.

(2g) In addition to the mobile removal device 1 described above, the present disclosure can also be realized in various forms, such as a system including the mobile removal device 1, a program for causing a computer to function as the mobile removal device 1, a non-transitory tangible storage medium, such as a semiconductor memory, in which this program is recorded, and a weeding method.

What is claimed is:

1. A mobile removal device configured to irradiate, with a laser beam, a hindrance capable of inhibiting plant growth, the mobile removal device comprising:

a camera configured to capture the hindrance;

a laser oscillator configured to output the laser beam;

a controller configured to detect the hindrance based on a captured image taken by the camera and to control the laser oscillator;

a guide portion configured to guide the laser beam output by the laser oscillator; and a movement mechanism configured to move the mobile removal device, the guide portion including one or more reflectors configured to reflect the laser beam, at least one of the one or more reflectors being a specific reflector having a function of reflecting the laser beam and a function of transmitting a light that can be captured by the camera, the camera being arranged so that an optical axis of the camera passes through the specific reflector in an area where the laser beam does not pass through the specific reflector, and an origin of an image recognition region of the camera being coincident or substantially coincident with an origin of an irradiation position of the laser beam.

2. The mobile removal device according to claim 1, wherein the controller is configured to change a direction in which the one or more reflectors reflect the laser beam to thereby control the irradiation position of the laser beam.

3. The mobile removal device according to claim 2, wherein at least one of the one or more reflectors is configured as a galvanometer mirror.

4. The mobile removal device according to claim 2, wherein the controller is configured to recognize the irradiation position of the laser beam based on the captured image taken by the camera, and to correct the irradiation position of the laser beam.

5. The mobile removal device according to claim 1, wherein the specific reflector is configured as a dichroic mirror.

6. The mobile removal device according to claim 1, wherein the controller is configured to output the laser beam from the laser oscillator while the mobile removal device is moved by the movement mechanism.

7. The mobile removal device according to claim 1, wherein the laser oscillator is configured to output a blue laser beam.

8. The mobile removal device according to claim 4, wherein the controller is configured to obtain the captured image taken by the camera and recognize an actually irradiated position of the laser beam within the captured image, thereby recognizing a deviation in the irradiation position of the laser beam.

9. The mobile removal device according to claim 8, wherein the mobile removal device further comprises a galvanometer scanner that is configured to change an orientation of the specific reflector, and wherein the controller is configured to calculate a coordinate difference between a target position and the actually irradiated position of the laser beam, and to drive the specific reflector using the galvanometer scanner such that the coordinate difference becomes zero.

10. The mobile removal device according to claim 1, wherein the one or more reflectors of the guide portion include at least one intermediate mirror operatively coupled between the laser oscillator and the specific reflector, and being configured to alter a direction of the laser beam by at least 90 degrees.

11. The mobile removal device according to claim 10, wherein the at least one intermediate mirror comprises at least one galvanometer mirror.

12. The mobile removal device according to claim 10, wherein the at least one intermediate mirror comprises at least two intermediate mirrors.

13. The mobile removal device according to claim 12, wherein the at least two intermediate mirrors are configured to alter the direction of the laser beam by at least 180 degrees.

14. The mobile removal device according to claim 10, wherein the at least one intermediate mirror comprises at least three intermediate mirrors, and the at least three intermediate mirrors are configured to alter the direction of the laser beam by about 270 degrees.

* * * * *